United States Patent [19]
Chiba et al.

[11] Patent Number: 5,605,641
[45] Date of Patent: Feb. 25, 1997

[54] METHOD AND APPARATUS FOR LASER MARKING A CONTINUOUSLY MOVING WORKPIECE

[75] Inventors: Teiichiro Chiba; Koji Yoshida, both of Hiratsuka, Japan

[73] Assignee: Komatsu Ltd., Tokyo, Japan

[21] Appl. No.: 433,417

[22] PCT Filed: Nov. 24, 1993

[86] PCT No.: PCT/JP93/01718

§ 371 Date: May 23, 1995

§ 102(e) Date: May 23, 1995

[87] PCT Pub. No.: WO94/12310

PCT Pub. Date: Jun. 9, 1994

[30] Foreign Application Priority Data

Nov. 25, 1992 [JP] Japan ................................ 4-336753

[51] Int. Cl.$^6$ .......................... B23K 26/06; B41J 2/465; G02B 26/08
[52] U.S. Cl. ................ 219/121.68; 219/121.69; 219/121.73; 219/121.8
[58] Field of Search .................... 219/121.68, 121.69, 219/121.73, 121.74, 121.78, 121.8, 121.79, 121.81, 121.82; 359/201, 202, 487; 347/248, 258, 259, 260, 261

[56] References Cited

U.S. PATENT DOCUMENTS

| | | | |
|---|---|---|---|
| 4,746,202 | 5/1988 | Perilloux et al. | 219/121.74 |
| 5,309,273 | 5/1994 | Mori et al. | 219/121.68 |

FOREIGN PATENT DOCUMENTS

| | | | |
|---|---|---|---|
| 285097 | 10/1988 | European Pat. Off. | 347/260 |
| 495647 | 7/1992 | European Pat. Off. | 219/121.68 |
| 4102936 | 8/1992 | Germany | 219/121.6 |
| 57-14981 | 1/1982 | Japan . | |
| 57-81984 | 5/1982 | Japan | 219/121.82 |
| 60-227994 | 11/1985 | Japan | 219/121.67 |
| 64-11083 | 1/1989 | Japan | 219/121.68 |
| 2-15887 | 1/1990 | Japan . | |
| 2-96714 | 4/1990 | Japan . | |
| 2-187288 | 7/1990 | Japan | 219/121.68 |
| 2187289 | 7/1990 | Japan | 219/121.6 |
| 2-251387 | 10/1990 | Japan . | |

*Primary Examiner*—Geoffrey S. Evans
*Attorney, Agent, or Firm*—Sidley & Austin

[57] ABSTRACT

A laser marking apparatus and method for laser marking workpieces to be marked, which are continuously fed without stopping the workpiece each time, thus raising production efficiency. Therefore, the laser marking apparatus comprises a laser oscillator (1); a first polarizer (3) for polarizing a laser beam from the laser oscillator (1) and raster-scanning the laser beam; a mask (6) capable of displaying a specified pattern which selects the laser beam to be raster-scanned by the first polarizer (3) and admits the laser beam to pass therethrough; and a second polarizer (9) for further polarizing the raster-scanned laser beam which has passed through the mask (6) and irradiating the pattern onto a surface of a workpiece to be marked, the second polarizer (9) being provided with a reflection mirror (10) for reflecting the laser beam which has passed through the mask (6), and a movable lens (13) for receiving the laser beam from the reflection mirror and irradiating the laser beam onto the workpiece (8) to be marked, the movable lens (13) being mounted on a moving mechanism (15). The laser beam is irradiated to perform marking on the workpiece (8) while moving the movable lens (13) in synchronism with the workpiece (8).

30 Claims, 5 Drawing Sheets

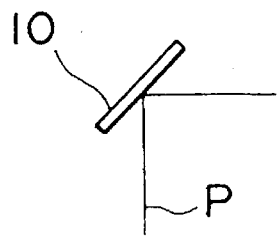
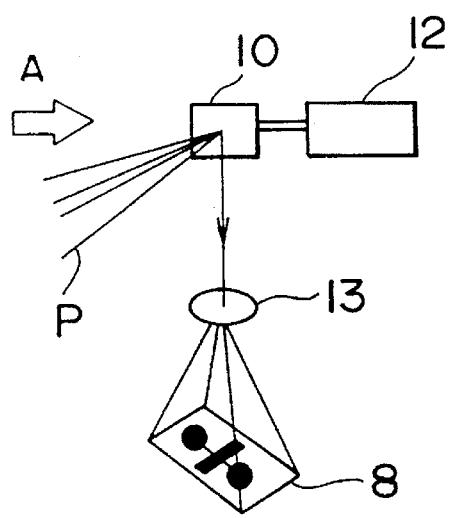
A VIEW
FIG.3A  FIG.3B
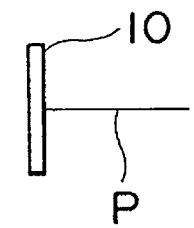
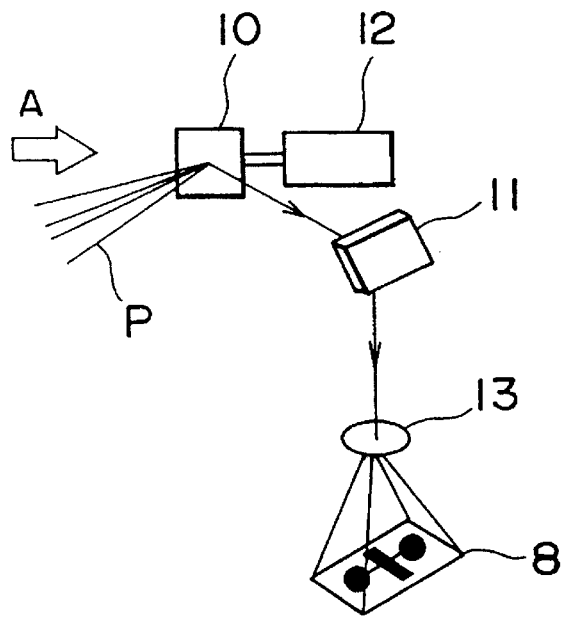
A VIEW
FIG.4A  FIG.4B

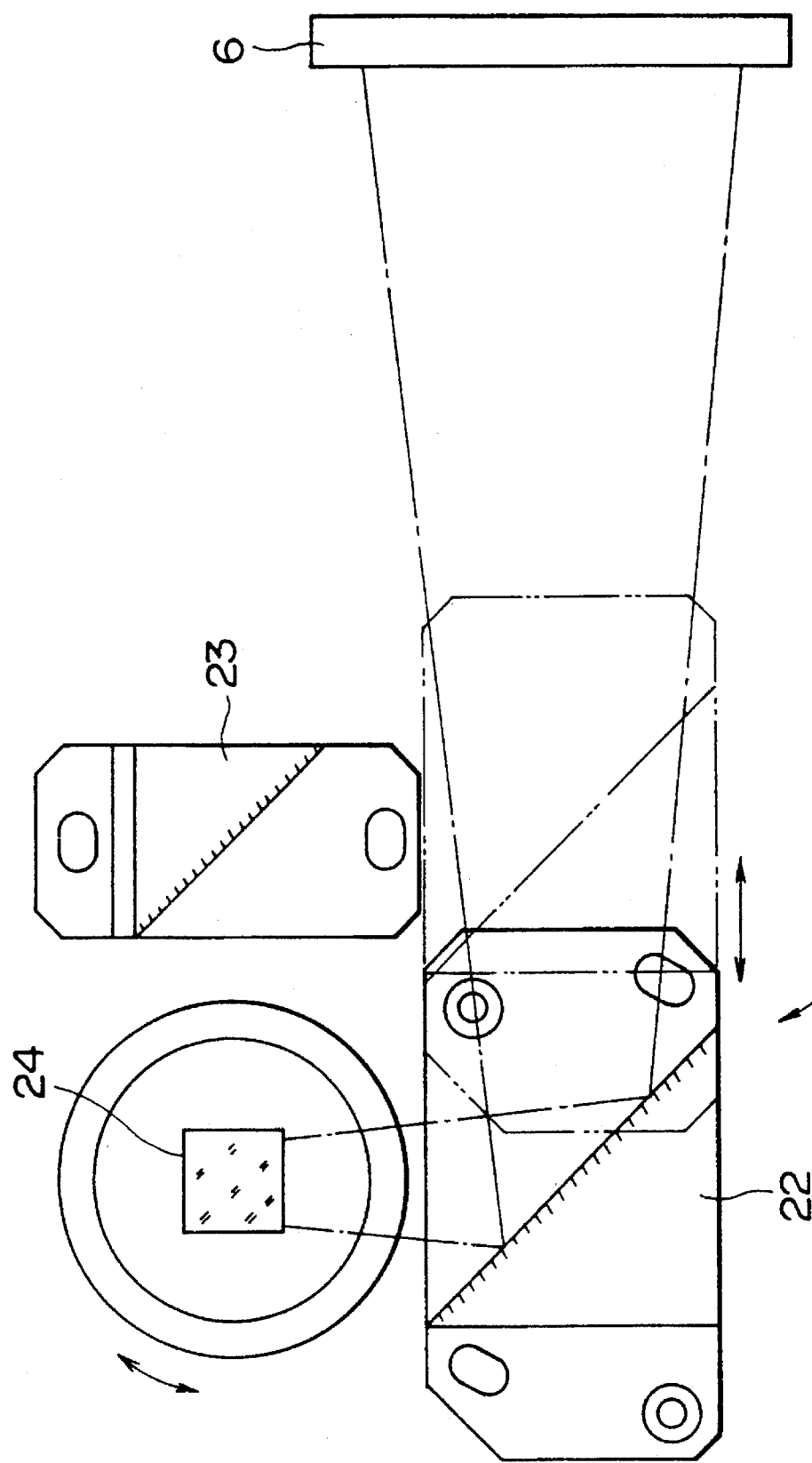

METHOD AND APPARATUS FOR LASER MARKING A CONTINUOUSLY MOVING WORKPIECE

FIELD OF THE INVENTION

The present invention relates to method and apparatus for performing laser marking on a plurality of objects which are continuously fed for marking.

RELATED BACKGROUND ART

An ink jet marking method has hitherto been widely used for marking patterns, composed of characters, symbols, diagrams and figures, on workpieces such as, for example, metals, synthetic resins, ceramics, papers, and fabrics, which are manufactured in factory lines. This system is intended to carry out marking while changing relative positions of a workpiece and an ink jet nozzle by a transfer unit as disclosed, for example, in Japanese Patent Application Disclosure Gazette SHO. 57-14981, and therefore conjunctive operation of the transfer unit and the ink jet unit is essentially required.

Along with a trend in recent years of downsizing workpieces, such as semiconductor products, the marks to be used have had to become smaller with greater preciseness. Therefore, a laser marking apparatus has been used lately instead of the ink jet system. The conventional laser marking apparatus has been such that a laser beam, obtained from a laser oscillator through a polarizer, is used to raster-scan a mask surface, and the laser beam which passes through the mask is irradiated onto a workpiece.

However, in such laser marking apparatus, the laser beam which passes through the mask is polarized toward a workpiece transfer line, a workpiece is temporarily stopped when it reaches a laser irradiation area, which is fixed, and marking is performed by irradiating the laser beam onto the surface of this stationary workpiece. Therefore this system includes a problem in that the transfer line has to be stopped for marking on each workpiece, and improvement of the production time will be impaired.

SUMMARY OF THE INVENTION

An object of the present invention, made in view of the above problem, is to provide method and apparatus for performing laser marking on an object which is fed without stopping during laser beam marking, thus improving production efficiency.

The present invention provides a laser marking apparatus comprising a first polarizer for polarizing a laser beam from a laser oscillator for raster-scanning, a mask capable of displaying a specified pattern through which a raster-scanning laser beam from the first polarizer is selectively transmitted, a second polarizer for further polarizing the raster-scanning beam which has been transmitted through the mask and irradiating the further polarized laser beam onto the object for marking the pattern onto the object, wherein the second polarizer is provided with a reflection mirror which reflects the laser beam which has been transmitted through the mask, and a movable lens which receives the reflected laser beam and irradiates the reflected laser beam for marking, the movable lens being mounted on a moving mechanism which moves in synchronism with a workpiece transfer speed. The reflection mirror comprises a first mirror, which reflects the laser beam passing through the mask, and a second mirror, which can reflect the previously reflected beam to the movable lens, and the direction of reflection of the first mirror is changeable between toward the second mirror and toward the movable lens. This reflection mirror can comprise a movable mirror, which directly reflects the laser beam passing through the mask and is movable horizontally; a rotary mirror, which reflects the reflected beam to a movable lens and is rotatable on a flat surface; and a fixed mirror, which can receive the reflected beam by movement of the movable mirror and is able to reflect the reflected beam to the rotary mirror; the direction of reflection of the reflection mirror being changeable, between toward the rotary mirror and toward the fixed mirror, in accordance with the position of the movable mirror. In addition, the moving mechanism which mounts the movable lens is formed by an orthogonal two axis planar moving mechanism, one axial direction of which is aligned with the workpiece transfer direction, and drive means for this axial direction drives the moving mechanism in synchronism with the workpiece transfer speed.

In a laser marking method wherein the laser beam from the laser oscillator passes through the first polarizer and is raster-scanned onto a mask capable of displaying a specified pattern whereby the laser beam is selected and transmitted therethrough, the second polarizer further polarizes the raster-scanned laser beam which has passed through the mask and irradiates the polarized laser beam onto a workpiece surface in accordance with the raster-scanned marking pattern; the second polarizer comprises a reflection mirror and a movable lens, and the laser beam is irradiated onto the workpiece while the movable lens is moved in the workpiece transfer direction in synchronism with the workpiece transfer speed. The reflection mirror comprises a movable mirror and a fixed mirror, the laser beam reflected from the movable mirror is changeable between toward the fixed mirror and toward the movable lens, the laser beam is irradiated thereto by operating the movable mirror, and the pattern is thus rotated.

The configuration described above enables a more flexible plane positioning, by the second polarizer of the mask information obtained from the first polarizer, and the synchronism of the movement of the movable lens with the workpiece without any change of the workpiece transfer unit. With this, the laser marking apparatus can be more flexible in its operation, and a load on the transfer unit can be relieved; therefore the versatility is increased, and the production efficiency can be improved by carrying out laser marking even in a continuous feeding condition.

Figure 5:
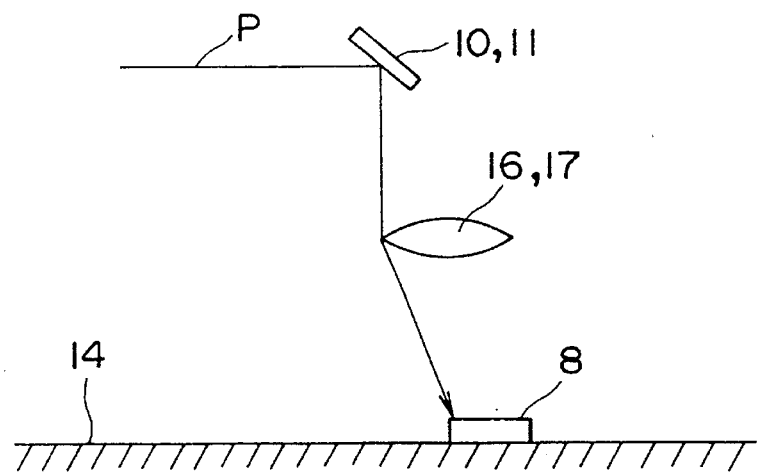
Figure 6:
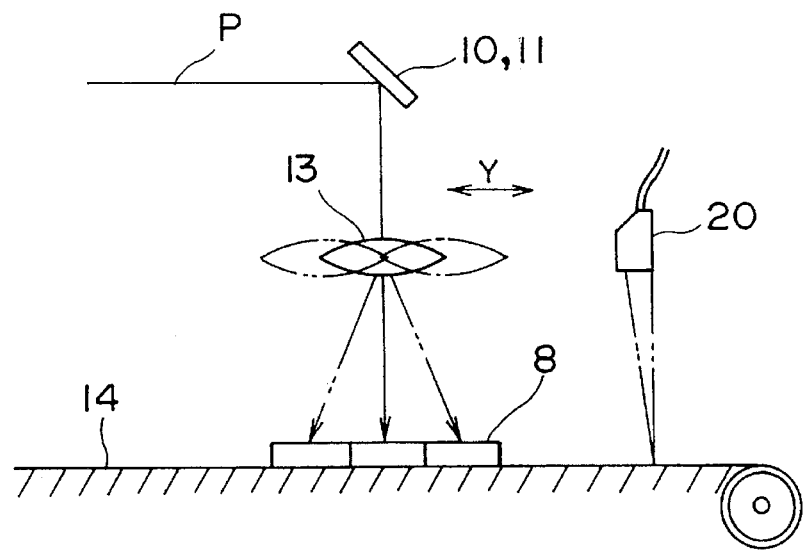
Figure 7:
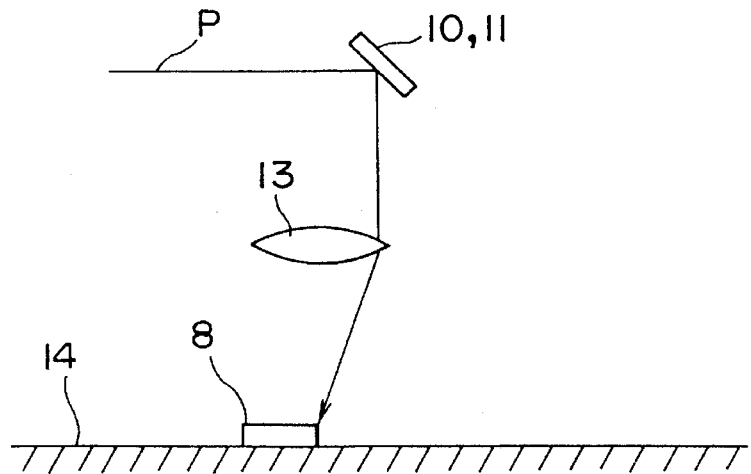

Each of FIGS. 3A and 3B is an illustration of a first polarizing mirror of the second polarizer which directly polarizes to a movable lens;

Each of FIGS. 4A and 4B is an illustration of a first polarizing mirror of the second polarizer which polarizes to the movable lens via a second polarizing mirror;

FIG. 5 is an illustration of the beginning state of marking;

FIG. 6 is an illustration of a state of the movable lens synchronized with the transfer unit;

FIG. 7 is an illustration of the end of marking; and

FIG. 8 is a plan view of a reflection mirror of the second polarizer according to the second embodiment.

BEST MODE FOR CARRYING OUT THE INVENTION

A first embodiment according to the present invention is described in detail below referring to FIGS. 1 to 7.

Figure 1:
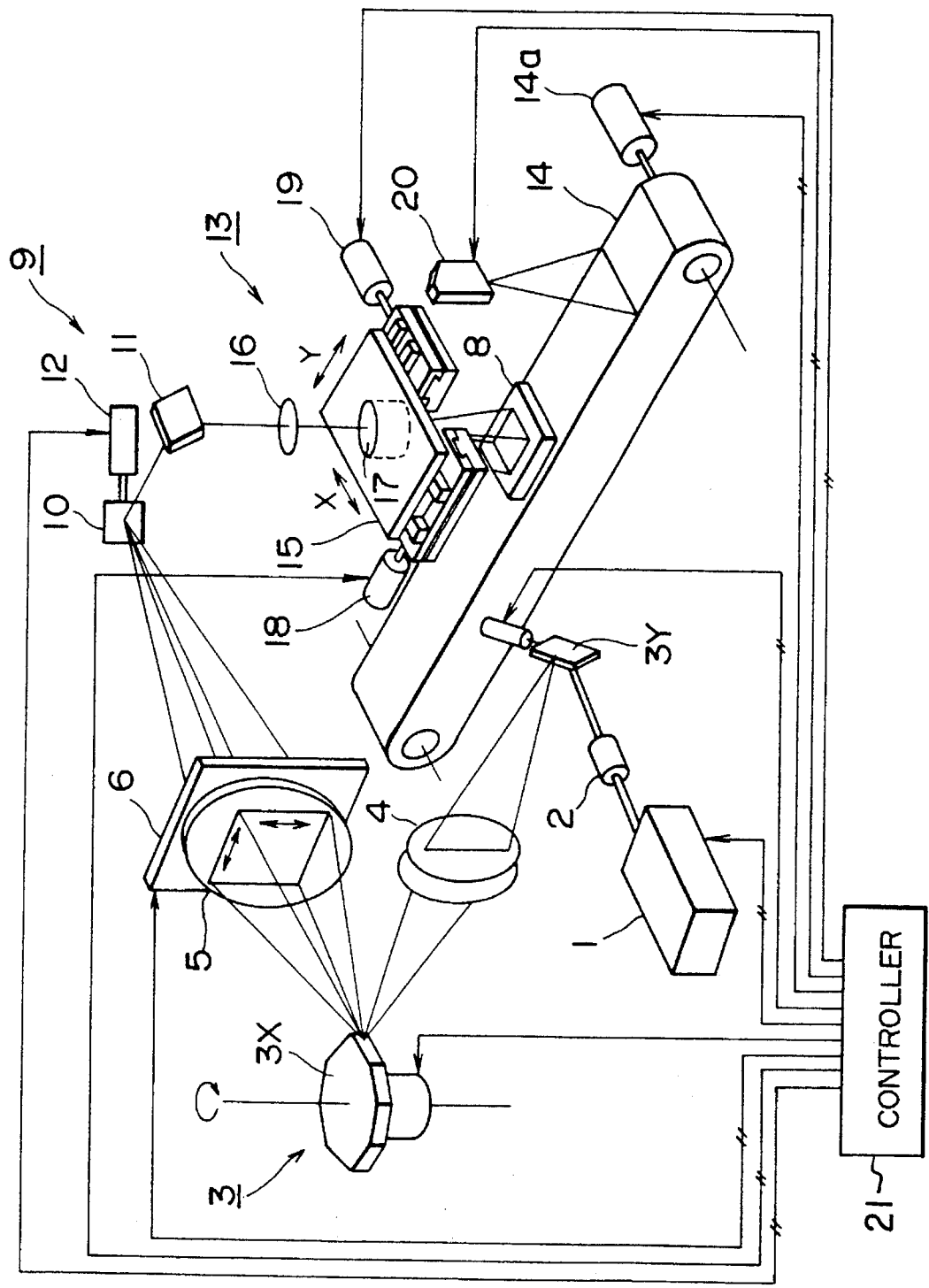
FIG. 1 is a configuration diagram of a laser marking apparatus according to a first embodiment of the present invention.

As shown in FIG. 1, a laser marking apparatus of this embodiment is provided with a YAG laser oscillator 1, serving as a laser beam source, and a first polarizer 3, which condenses a laser beam from the YAG oscillator 1 through an optical lens 2, then polarizes the laser beam in the X and Y directions, and raster-scans the laser beam. An optical system 4, which condenses the laser beam reflected from a Y-direction polarizer to one point on the polarizing plane of an X-direction polarizer of the first polarizer 3, is arranged at an intermediate part of the first polarizer 3.

The first polarizer 3 comprises a polygon mirror 3X, which is the X-direction polarizer, and a rotary mirror 3Y, which is the Y-direction polarizer, arranged with their rotation axes intersecting orthogonally and with the optical system 4 disposed therebetween. The polygon mirror 3X is a 36-face hedron which is rotatable in several fixed speed rotation modes, an optimum mode of which is selected for each workpiece. In other words, one face of the polygon mirror 3X corresponds to one line in the X direction on the liquid crystal mask, described later, and one rotation of the polygon mirror 3X corresponds to thirty six lines in the X direction. On the other hand, a rotary mirror 3Y is adapted to stop after it rotates only a small polarizing angle while a laser beam receiving point is changed from one face to the next face as the polygon mirror 3X rotates. The rotary mirror 3Y operates at 43 small polarizing angles. The rotary mirror 3Y reversely rotates to return at once from the final 43rd angle to the first angle. Although the 22nd angle can be set as a neutral position, in this embodiment the first angle is set as the neutral position in accordance with the raster-scanning start position. In other words, one small polarizing angle of the rotary mirror 3Y corresponds to the line spacing in the Y direction on the liquid crystal mask and the rotary mirror 3Y is rotated by one small polarizing angle each time one revolution of the polygon mirror 3X is finished and stays at that position until another revolution of the polygon mirror 3X is finished.

In addition, a liquid crystal mask 6, which receives the laser beam that is raster-scanned by the first polarizer 3 and which can display a pattern for electrically passing or scattering the received laser beam, is provided so that a desired marking pattern can thus be formed. The liquid crystal mask 6 is a so-called transmission dispersion type liquid crystal mask, for example, the "Liquid Crystal Resin Composite Comprising a Liquid Crystal and a Resin" in Japanese Patent Application Disclosure Gazette HEI. 2-96714 corresponds to this liquid crystal mask. This liquid crystal mask 6 is provided with two sets of a number of parallel electrode lines, with one set on the obverse surface being perpendicular to the other set on the reverse surface of the mask, whereby the laser beam scatters in the portion of the liquid crystal to which no voltage is applied and passes through the portion of the liquid crystal to which the voltage is applied. Using such electrical characteristics as described above, a desired marking pattern is instantaneously imaged by selectively applying a voltage to the electrodes lines. Differing from the conventional liquid crystal mask, this liquid crystal mask 6 does not require a polarizing plate. Consequently, the intensity of the laser beam which passes through the liquid crystal mask is more than two times that with a conventional liquid crystal mask. In this embodiment, each of the marking patterns for this liquid crystal mask 6 is displayed with a dot matrix comprising 24-dots in each of the vertical and horizontal axes. This liquid crystal mask 6 is available in various types of dot matrixes including 72 dots×36 dots.

A second polarizer 9, for polarizing the laser beam which passes through the mask in accordance with a marking pattern and toward the surface of a marking workpiece 8, is provided at the outlet side of the liquid crystal mask 6. The second polarizer 9 has a first polarizing mirror 10, which directly reflects the laser beam which passes through the liquid crystal mask 6, and a second polarizing mirror 11, which reflects the reflection beam from the first polarizing mirror 10 toward a movable lens 13, described later. In this case, the first polarizing mirror 10 is adapted to change between reflecting directly toward the movable lens 13 and indirectly via the second polarizing mirror 11. In other words, the first polarizing mirror can be rotated by a mirror drive motor 12, while the second polarizing mirror 11 is fixed with its polarizing direction faced toward the movable lens 13.

The movable lens 13, which receives the polarized laser beam directly from the first polarizing mirror 10 or indirectly via the second polarizing mirror 11 as described above, is arranged above a belt conveyor type transfer unit 14 by which a workpiece 8 to be marked is transferred. The movable lens 13 comprises an objective lens 16, which moves integrally with an XY table 15, and a marking lens 17, which is fixed in an opening in the XY table 15, so that the optical axis is aligned with the objective lens 16 and carries out pattern marking on the workpiece 8 passing under the XY table 15. The objective lens 16 receives the laser beam from the second polarizing mirror 11 to compensate for any distortion of an image. The XY table 15 is provided with a Y-direction drive motor 18, for driving the objective lens 16 so as to be aligned with the transfer direction of the workpiece 8, and an X-direction drive motor 19, for driving the objective lens in a direction at right angles to the movement of the Y-direction drive motor. The XY table 15 is moved in a resultant drive direction in the XY plane by the X-direction drive motor 19 and the Y-direction drive motor 18.

On the other hand, a workpiece position detector 20, for detecting the workpiece 8, is provided at an upstream end of the workpiece transfer unit 14. A controller 21, which totally controls all drive units described above, is provided. This controller 21 generates marking pattern signals to form a laser beam transmitting image, corresponding to the pattern on the liquid crystal mask 6, and drives the first polarizer 3 to raster-scan the laser beam on such liquid crystal mask 6. For setting the marking direction of the pattern on the surface of workpiece 8, the polarizing direction of the first polarizing mirror 10 in the second polarizer 9 is determined, and the mirror drive motor 12 is driven according to this polarizing direction. When the workpiece 8 on the transfer unit 14 reaches the marking position, a signal from the workpiece detector 20 is inputted and the Y-direction drive motor 18 is started so that synchronized movement of the workpiece 8 is carried out along the transfer direction, and the laser marking is conducted while the workpiece 8 is being transferred.

Figure 2:
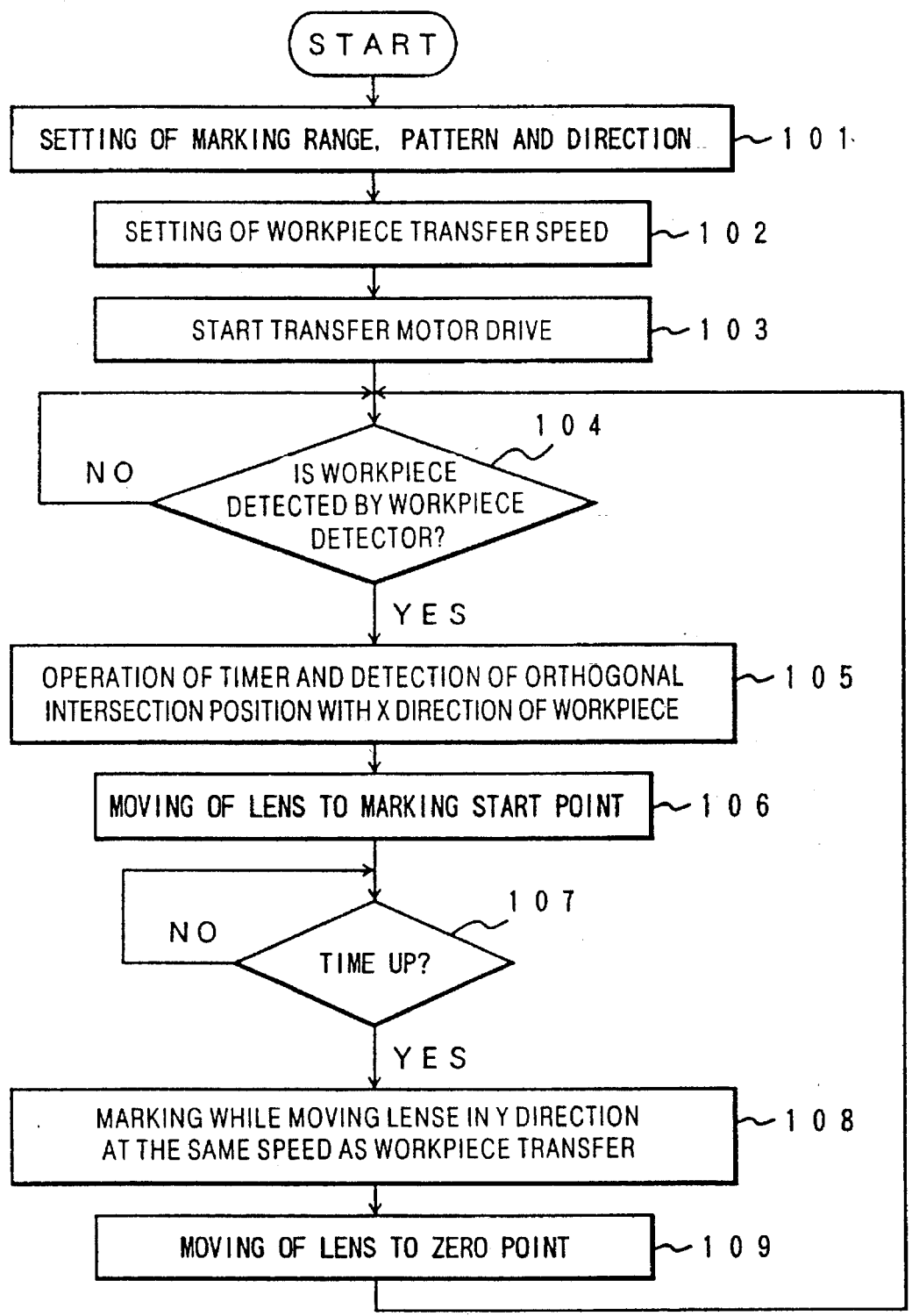
FIG. 2 is an operation flow chart of the apparatus shown in FIG. 1.

An operation flow chart based on the controller 21 is shown in FIG. 2. First of all, the marking pattern, marking range, and marking direction on the workpiece 8 are set (step 101). As regards the marking direction, if the polarizing direction to the movable lens 13 is set by the mirror drive motor 12 slanting the first polarizing mirror 10 as shown in FIGS. 3A and 3B, the laser beam P is polarized in a direction normal to the workpiece 8. As a result, the pattern shown is marked on the surface of the workpiece 8. When the first polarizing mirror 10 is vertically set by the mirror drive motor 12 as shown in FIGS. 4A and 4B, the laser beam P is polarized to be introduced onto the second polarizing mirror 11, which is fixed in a direction parallel to the workpiece 8. The second polarizing mirror 11 is directed to the movable lens 13 thereunder, and the laser beam P is polarized in a direction normal to the workpiece 8. As a result, a pattern, in a direction relatively rotated by 90 degrees in reference to the pattern shown in FIG. 3B, is marked on the surface of workpiece 8. In other words, the direction of the marking pattern can be selected as required, by controlling only the mirror drive motor 12 after the transfer unit 14 moves the workpiece 8 immediately below the first polarizing mirror 10 or the second polarizing mirror 11.

Next, a transfer speed of the workpiece 8 is set (step 102). Since the available range of marking by the laser marking apparatus is limited, it is necessary to conduct marking of one pattern in this limited range. Therefore, the transfer speed of the workpiece 8 is determined in accordance with the size of the marking range and the direction.

After such preparatory operation, the drive motor 14a for driving the transfer unit 14 is started (step 103), and the presence of the workpiece 8 is detected by the workpiece position detector 20 installed on the transfer unit 14 to determine the time when the workpiece 8 is fed into the marking range (step 104). In case the presence of the workpiece 8 is detected, the timer in the controller 21 is started, and a direction which orthogonally intersects the feeding direction of the workpiece 8 is detected by the workpiece position detector 20 (step 105). Then the movable lens 13 is moved to the marking start point by operating the XY table 15 (step 106). This marking start point is a stroke end of the feeding direction for the workpiece 8 to the upstream side for transfer in the available range of marking of the marking apparatus and a position orthogonally intersecting the feed direction of the workpiece 8.

After the movable lens 13 has been moved to the marking start point, it remains in a waiting state (step 107) for a period until the workpiece 8 is fed to this marking start point. This waiting time is uniformly determined according to the transfer speed and the distance from the workpiece position detector 20 to the available range of marking. Marking is started when the workpiece 8 reaches the marking start point (step 108). A fixed pattern is marked on the surface of the workpiece 8 by relatively synchronizing and moving the marking position while maintaining the transfer speed of the workpiece 8 at a fixed value as shown in FIG. 5. Synchronization of the marking position is carried out by the Y-direction drive motor 18 of the XY table 15 to maintain the moving speed of the movable lens 13 and the transfer speed of the workpiece 8 to be equal as shown in FIG. 6. The fixed pattern is marked by this synchronized movement, and the marking operation on one workpiece is thus finished, as shown in FIG. 7.

After completion of the marking on one workpiece 8, the movable lens 13 is moved to the upstream side of transfer (step 109) for workpieces 8 which will be fed in sequence, and the operation returns to step 104 to repeat the same operation. Thus, continuous laser marking can be carried out without stopping the transfer of the workpieces 8.

This embodiment enables the implementation of laser marking of a desired pattern on the surface of a workpiece 8 by the action of the second polarizer 9, and particularly the selective marking at desired parallel positions in two directions of rotation. Particularly, it is satisfactory for the transfer unit 14 to have only one freedom in the feeding direction, and therefore marking can be carried out while continuously operating the transfer unit 14. Accordingly, the load on the transfer unit 14 is eliminated to increase the versatility, and the workpiece manufacturing tact time is reduced to improve the production efficiency.

A configuration of the reflection mirror in the second polarizer 29 is described as a second embodiment, referring to FIG. 8.

The second polarizer 29 comprises a movable mirror 22, a fixed mirror 23, and a rotary mirror 24. The movable mirror 22, which directly reflects the laser beam which has passed through the liquid crystal mask 6, is installed so that the distance from the liquid crystal mask 6 is variable. The fixed mirror 23 and the rotary mirror 24 are arranged in parallel to the moving direction of the movable mirror 22. The movable mirror 22 is adapted to be positioned at a first position, where the reflecting direction is faced toward the fixed mirror 23, and at a second position, where the reflecting direction is faced toward the rotary mirror 24. The rotary mirror 24 is adapted to be rotatable in a plane at the center of the reflection surface so that the beam receiving direction can be faced toward the movable mirror 22 or the fixed mirror 23 by rotating 90 degrees in the plane. The rotary mirror 24 reflects the laser beam, received directly from the movable mirror 22 or indirectly via the fixed mirror 23, to the movable lens 13 (in a direction orthogonally intersecting the paper surface in the diagram). The fixed mirror 23 is fixed so that the direction of reflection is faced toward the rotary mirror 24 and, when the fixed mirror 23 receives the laser beam by the movement of the movable mirror 22, the laser beam is reflected to the rotary mirror 24. Thus, the reflecting direction is changed between toward the rotary mirror 24 or toward the fixed mirror 23 in accordance with a varying position of the movable mirror 22, and laser marking of the specified pattern is carried out by rotating the pattern 90 degrees in the plane.

INDUSTRIAL APPLICABILITY

The present invention is useful as a laser marking apparatus and method which permit laser marking on marking workpieces, which are continuously fed without stopping the feeding of the workpieces, and further improvement of production efficiency.

What is claimed:

1. A laser marking apparatus for marking workpieces, said apparatus comprising:

a transfer mechanism for moving a workpiece in a workpiece feeding direction through a laser irradiation area at a workpiece transfer speed Without any Stopping of the movement of the workpiece;

a laser oscillator for providing a laser beam;

a first polarizer for polarizing said laser beam from said laser oscillator and raster-scanning the thus polarized laser beam;

a mask capable of displaying a specified pattern which selectively passes the thus raster-scanned laser beam;

a second polarizer for further polarizing the thus raster-scanned laser beam which has passed through said mask, said second polarizer being provided with a reflection mirror device for reflecting said thus raster-scanned laser beam which has passed through said mask;

a movable lens for receiving a reflected laser beam from said reflection mirror and irradiating the thus received reflected laser beam Onto a workpiece in said laser irradiation area; and a moving mechanism, on which said movable lens is mounted, for moving said movable lens in synchronism with said workpiece transfer speed;

wherein said reflection mirror device comprises:

a first mirror for receiving and reflecting the thus raster-scanned laser beam which has passed through said mask; and a second mirror for reflecting to said movable lens a laser beam reflected by said first mirror;

wherein said first mirror is movable between a first position and a second position thereof, said first mirror in said first position directing the laser beam reflected by said first mirror toward said second mirror, said first mirror in said second position directing the laser beam reflected by said first mirror toward said movable lens.

2. A laser marking apparatus in accordance with claim 1, further comprising a mechanism for moving said first mirror between said first position and said second position.

3. A laser marking apparatus in accordance with claim 2, wherein said moving mechanism comprises:

an orthogonal two axis planar moving mechanism having one axial direction thereof aligned with said workpiece feeding direction; and drive means for moving said movable lens in said one axial direction in synchronism with said workpiece transfer speed.

4. A laser marking apparatus in accordance with claim 3, wherein said second mirror is fixed.

5. A laser marking apparatus in accordance with claim 4, further comprising:

a controller;

a workpiece position detector for detecting a workpiece upstream of said laser irradiation area and for inputting a signal to said controller in response to a thus detected workpiece;

wherein said controller provides a control signal to said moving mechanism for moving said movable lens in synchronism with movement of the thus detected workpiece through said laser irradiation area.

6. A laser marking apparatus in accordance with claim 5, wherein said controller also controls said transfer mechanism, said first polarizer, said mask, and said second polarizer.

7. A laser marking apparatus for marking workpieces, said apparatus comprising:

a transfer mechanism for moving a workpiece in a workpiece feeding direction through a laser irradiation area at a workpiece transfer speed without any stopping of the movement of the workpiece;

a laser oscillator for providing a laser beam;

a first polarizer for polarizing said laser beam from said laser oscillator and raster-scanning the thus polarized laser beam;

a mask capable of displaying a specified pattern which selectively passes the thus raster-scanned laser beam;

a second polarizer for further polarizing the thus raster-scanned laser beam which has passed through said mask, said second polarizer being provided with a reflection mirror device for reflecting said thus raster-scanned laser beam which has passed through said mask;

a movable lens for receiving a reflected laser beam from said reflection mirror and irradiating the thus received reflected laser beam onto a workpiece in said Laser irradiation area; and a moving mechanism, on which said movable lens is mounted, for moving said movable lens in synchronism with said workpiece transfer speed;

wherein said reflection mirror device comprises:

a first mirror which reflects a laser beam incident thereon toward said movable lens;

a second mirror for reflecting a laser beam incident thereon toward said first mirror; and a third mirror for receiving and reflecting the thus raster-scanned laser beam which has passed through said mask, said third mirror being movable between a first position and a second position;

wherein in said first position said third mirror directs the laser beam reflected by said third mirror toward said second mirror, and in said second position said third mirror directs the laser beam reflected by said third mirror toward said first mirror.

8. A laser marking apparatus in accordance with claim 7, wherein said moving mechanism comprises:

an orthogonal two axis planar moving mechanism having one axial direction thereof aligned with said workpiece feeding direction; and drive means for moving said movable lens in said one axial direction in synchronism with said workpiece transfer speed.

9. A laser marking apparatus in accordance with claim 7, wherein said first mirror is a rotary mirror, and wherein said second mirror is fixed.

10. A laser marking apparatus in accordance with claim 9, wherein said rotary mirror is rotatable in a plane, and wherein said first and second positions of said third mirror are in said plane.

11. A laser marking apparatus in accordance with claim 9, wherein said moving mechanism comprises:

an orthogonal two axis planar moving mechanism having one axial direction thereof aligned with said workpiece feeding direction; and drive means for moving said movable lens in said one axial direction in synchronism with said workpiece transfer speed.

12. A laser marking apparatus in accordance with claim 11, further comprising:

a controller;

a workpiece position detector for detecting a workpiece upstream of said laser irradiation area and for inputting a signal to said controller in response to a thus detected workpiece;

wherein said controller provides a control signal to said moving mechanism for moving said movable lens in synchronism with movement of the thus detected workpiece through said laser irradiation area.

13. A laser marking apparatus in accordance with claim 12, wherein said controller also controls said transfer mechanism, said first polarizer, said mask, and said second polarizer.

14. A laser marking apparatus for marking workpieces, said apparatus comprising:

a transfer mechanism for moving a workpiece in a workpiece feeding direction through a laser irradiation area at a workpiece transfer speed without any stopping of the movement of the workpiece;

a laser oscillator for providing a laser beam;

a first polarizer for polarizing said laser beam from said laser oscillator and raster-scanning the thus polarized laser beam;

a mask capable of displaying a specified pattern which selectively passes the thus raster-scanned laser beam;

a second polarizer for further polarizing the thus raster-scanned laser beam which has passed through said mask, said second polarizer being provided With a reflection mirror for reflecting said thus raster-scanned laser beam which has passed through said mask;

a movable lens for receiving a reflected laser beam from said reflection mirror and irradiating the thus received reflected laser beam onto a workpiece in said laser irradiation area; and a moving mechanism, on which said movable lens is mounted, for moving said movable lens in synchronism with said workpiece transfer speed;

wherein said moving mechanism comprises:

an orthogonal two axis planar moving mechanism having a first axial direction thereof aligned with said workpiece feeding direction and a second axial direction which is at a right angle to said first axial direction;

drive means for moving said movable lens in said first axial direction in synchronism with said workpiece transfer speed; and drive means for moving said movable lens in said second axial direction.

15. A laser marking apparatus in accordance with claim 14, further comprising:

a controller;

a workpiece position detector for detecting a workpiece upstream of said laser irradiation area and for inputting a signal to said controller in response to a thus detected workpiece;

wherein said controller provides a control signal to said moving mechanism for moving said movable lens in synchronism with movement of the thus detected workpiece through said laser irradiation area.

16. A laser marking apparatus in accordance with claim 15, wherein said controller also controls said transfer mechanism, said first polarizer, said mask, and said second polarizer.

17. A laser marking apparatus for marking a surface of a workpiece as the workpiece is transferred along a path in a workpiece transfer direction at a workpiece transfer speed, said apparatus comprising:

a laser oscillator for providing a laser beam, a first reflector for reflecting a laser beam provided by said laser oscillator so as to perform raster-scanning, a mask capable of selectively allowing transmission therethrough of the thus raster-scanned laser beam, to thereby display a marking pattern, a first mirror for reflecting a laser beam thus transmitted through said mask, movable lens for receiving a laser beam incident thereon and for applying the thus received laser beam to the surface of the workpiece, thereby marking said surface of the workpiece, a second mirror for reflecting to said movable lens a laser beam which has been reflected from said first mirror to said second mirror, a switching mechanism for switching the direction in which a laser beam is reflected from said first mirror, said switching mechanism having first and second positions so that in said first position a laser beam reflected from said first mirror is directed to and is incident on said movable lens and in said second position a laser beam reflected from said first mirror is directed to said second mirror so as to be reflected by said second mirror onto said movable lens, and a moving mechanism which moves in synchronism with said workpiece transfer speed, said movable lens being mounted on said moving mechanism for movement therewith so that the surface of the workpiece can be marked as the workpiece is transferred along said path at said workpiece transfer speed without having to stop the transferring of the workpiece for the marking of the workpiece.

18. A laser marking apparatus in accordance with claim 17, wherein said moving mechanism comprises an orthogonal biaxial planar moving mechanism having two orthogonal axes of movement, with a first one of said two orthogonal axes being aligned with said workpiece transfer direction and a second one of said two orthogonal axes being perpendicular to said workpiece transfer direction, and wherein said orthogonal biaxial planar moving mechanism can move said movable lens along said each of said two orthogonal axes with movement along said first one being at a speed which is in synchronism with said workpiece transfer speed.

19. A laser marking apparatus for marking a surface of a workpiece as the workpiece is transferred along a path in a workpiece transfer direction at a workpiece transfer speed, said apparatus comprising:

a laser oscillator for providing a laser beam, a first reflector for reflecting a laser beam provided by said laser oscillator so as to perform raster-scanning, a mask capable of selectively allowing transmission therethrough of the thus raster-scanned laser beam, to thereby display a marking pattern, a movable mirror adapted to receive and reflect said thus transmitted laser beam, said movable mirror being capable of planar movements, a rotatable mirror, a stationary mirror which can receive a laser beam, which has been reflected from said movable mirror to said stationary mirror, and can reflect the beam, thus received from said movable mirror, to said rotatable mirror, movable lens for receiving a laser beam incident thereon and for applying the thus received laser beam to the surface of the workpiece, thereby marking said surface of the workpiece, said rotatable mirror being adapted to reflect to said movable lens a laser beam which has been reflected from said movable mirror to said rotatable mirror as well as a laser beam which has been reflected from said stationary mirror to said rotatable mirror, said rotatable mirror being capable of planar rotation, a switching mechanism for switching the direction in which a laser beam is reflected from said movable mirror, said switching mechanism having first and second positions so that in said first position a laser beam reflected from said movable mirror is directed to said rotatable mirror and in said second position a laser beam reflected from said movable mirror is directed to said stationary mirror, and a moving mechanism which moves in synchronism with said workpiece transfer speed, said movable lens being mounted on said moving mechanism for movement therewith so that the surface of the workpiece can be marked as the workpiece is transferred along said path at said workpiece transfer speed without having to stop the transferring of the workpiece for the marking of the workpiece.

20. A laser marking apparatus in accordance with claim 19, wherein said moving mechanism comprises an orthogonal biaxial planar moving mechanism having two orthogonal axes of movement, with a first one of said two orthogonal axes being aligned with said workpiece transfer direction and a second one of said two orthogonal axes being perpendicular to said workpiece transfer direction, and wherein said orthogonal biaxial planar moving mechanism can move said movable lens along said each of said two orthogonal axes with movement along said first one being at a speed which is in synchronism with said workpiece transfer speed.

21. A laser marking method for marking workpieces, said method comprising the steps of:

moving a workpiece in a workpiece feeding direction through a laser irradiation area at a workpiece transfer speed;

producing a laser beam;

polarizing said laser beam;

displaying a pattern on a mask which selectively passes a laser beam incident thereto;

raster-scanning the thus polarized Laser .beam onto said mask having the thus displayed pattern so as to selectively pass the thus raster-scanned laser beam;

further polarizing the thus raster-scanned laser beam which has passed through said mask and reflecting the thus further polarized laser beam;

using a movable lens to receive the thus reflected further polarized laser beam and irradiating the thus received reflected laser beam onto a workpiece in said laser irradiation area; and moving said movable lens in synchronism with said workpiece transfer speed, whereby the thus irradiated laser beam marks a pattern on a workpiece in said laser irradiation area;

wherein said step of further polarizing the thus raster-scanned laser beam which has passed through said mask and reflecting the thus further polarized laser beam comprises:

receiving the thus raster-scanned laser beam onto a movable mirror and reflecting the thus received raster-scanned laser beam from said movable mirror to one of said movable lens and a fixed mirror;

reflecting a laser beam incident on said fixed mirror to said movable lens; and moving said movable mirror to change the direction of reflection of the thus received raster-scanned laser beam from one of said movable lens and said fixed mirror to the other of said movable lens and said fixed mirror, thereby rotating the pattern on said workpiece in said laser irradiation area.

22. A laser marking method in accordance with claim 21, further comprising:

detecting a workpiece upstream of said laser irradiation area and outputting a signal in response to a thus detected workpiece; and controlling said moving mechanism in response to said signal to move said movable lens in synchronism with movement of the thus detected workpiece through said laser irradiation area.

23. A laser marking method in accordance with claim 22, further comprising:

controlling the movement of a workpiece in a workpiece feeding direction through said laser irradiation area at a set workpiece transfer speed;

moving said movable lens from a marking start point at the expiration of a predetermined time period after a workpiece is detected upstream of said laser irradiation area, so that said movable lens is moved in the workpiece feeding direction at the same speed as the workpiece in the laser irradiation area;

moving said movable lens in a direction which is perpendicular to workpiece feeding direction while said workpiece is within said laser irradiation area, and returning said movable lens to said marking start point when the marking of the workpiece is completed.

24. A laser marking method for marking workpieces, said method comprising the steps of:

moving a workpiece in a workpiece feeding direction through a laser irradiation area at a workpiece transfer speed;

producing a laser beam:

polarizing said laser beam;

displaying a pattern on a mask which selectively passes a laser beam incident thereto;

raster-scanning the thus polarized laser beam onto said mask having the thus displayed pattern so as to selectively pass the thus raster-scanned laser beam;

further polarizing the thus raster-scanned laser beam which has passed through said mask and reflecting the thus further polarized laser beam;

using a movable lens to receive the thus reflected further polarized laser beam and irradiating the thus received reflected laser beam onto a workpiece in said laser irradiation area; and moving said movable lens in synchronism with said workpiece transfer speed, whereby the thus irradiated laser beam marks a pattern on a workpiece in said laser irradiation area;

wherein said step of further polarizing the thus raster-scanned laser beam which has passed through said mask and reflecting the thus further polarized laser beam comprises:

receiving the thus raster-scanned laser beam onto a movable mirror and reflecting the thus received raster-scanned laser beam from said movable mirror to one of a fixed mirror and a rotary mirror;

reflecting a laser beam incident on said fixed mirror to said rotary mirror;

reflecting a laser beam incident on said rotary mirror to said movable lens; and moving said movable mirror to change the direction of reflection of the thus received raster-scanned laser beam from one of said fixed mirror and said rotary mirror to the other of said fixed mirror and said rotary mirror, thereby rotating the pattern on said workpiece in said laser irradiation area.

25. A laser marking method for marking workpieces, said method comprising the steps of:

moving a workpiece in a workpiece feeding direction through a laser irradiation area at a workpiece transfer speed;

producing a laser beam;

displaying a pattern on a mask which selectively passes a laser beam incident thereto;

raster-scanning the thus produced laser beam onto said mask having the thus displayed pattern so as to selectively pass the thus raster-scanned laser beam through said mask;

receiving onto a movable mirror the thus raster-scanned laser beam which has passed through said mask and reflecting the thus received raster-scanned laser beam from said movable mirror to one of a movable lens and a second mirror;

reflecting a laser beam incident on said second mirror to said movable lens;

using said movable lens to receive a reflected laser beam and to irradiate the thus received reflected laser beam onto a workpiece in said laser irradiation area;

moving said movable lens in synchronism with a workpiece in said laser irradiation area, while the workpiece is being transferred in the workpiece transfer direction at said workpiece transfer speed, whereby the thus irradiated laser beam marks a pattern on said workpiece in said laser irradiation area; and moving said movable mirror to change the direction of reflection of the thus received raster-scanned laser beam from one of said movable lens and said second mirror to the other of said movable lens and said second mirror, thereby rotating the pattern on said workpiece in said laser irradiation area.

26. A method in accordance with claim 25, wherein a laser beam transmitted through said mask is swung by at least 90° between said mask and said movable lens.

27. A method in accordance with claim 25, wherein said second mirror is fixed.

28. A method in accordance with claim 25, wherein said step of receiving onto a movable mirror the thus raster-scanned laser beam which has passed through said mask and reflecting the thus received raster-scanned laser beam from said movable mirror to one of a movable lens and a second mirror comprises receiving onto said movable mirror the thus raster-scanned laser beam which has passed through said mask and reflecting the thus received raster-scanned laser beam from said movable mirror to one of said second mirror and a rotatable mirror, and directing to said movable lens a beam received by said rotatable mirror from said movable mirror, and wherein said step of reflecting a laser beam incident on said second mirror to said movable lens comprises reflecting a laser beam incident on said second mirror to said rotatable mirror, and directing to said movable lens a beam received by said rotatable mirror from said second mirror.

29. A method in accordance with claim 28, wherein said second mirror is fixed.

30. A method in accordance with claim 28, wherein said movable mirror is linearly movable in a plane, wherein second mirror is fixed, and wherein said rotatable mirror is rotatable about an axis perpendicular to said plane.

* * * * *